United States Patent [19]
Sekhavat et al.

[11] 4,119,173
[45] Oct. 10, 1978

[54] OPTICAL SEISMOGRAPH

[75] Inventors: Ali Sekhavat, P.O. Box 837, Teheran, Iran; Ali-Reza Bahrampour, Teheran, Iran

[73] Assignee: Ali Sekhavat, Teheran, Iran

[21] Appl. No.: 824,245

[22] Filed: Aug. 12, 1977

[51] Int. Cl.$^2$ .......................................... G01V 1/18
[52] U.S. Cl. ..................................... 181/122; 73/653
[58] Field of Search ............... 181/122; 340/17, 261; 73/653, 655; 356/152, 149; 33/1 HH, 283, 365

[56] References Cited

U.S. PATENT DOCUMENTS

| | | | |
|---|---|---|---|
| 1,869,828 | 8/1932 | Shrader | 73/653 |
| 2,343,063 | 2/1944 | Kent | 73/653 |
| 3,709,030 | 1/1973 | Aselman | 73/655 |
| 3,877,296 | 4/1975 | Rihn | 73/653 |

Primary Examiner—Nelson Moskowitz
Attorney, Agent, or Firm—Cameron, Kerkam, Sutton, Stowell & Stowell

[57] ABSTRACT

An optical seismograph which functions to measure the relative movement of a beam of electromagnetic waves connected to the extremities of a plurality of pendulums and includes a collimated source which delivers a parallel beam of electromagnetic waves and a plurality of pendulums whose oscillation paths are perpendicular to one another, means fixed in relation to the electromagnetic wave beam direct the luminous beam on the heavy extremities of the various pendulums; and photoelectric means to measure the position variations of the extremities of the pendulums in relation to the electromagnetic wave beam. The seismograph is suitable for the detection of earthquakes.

11 Claims, 7 Drawing Figures

OPTICAL SEISMOGRAPH

BACKGROUND OF THE INVENTION

This invention relates to a seismograph to measure the drifts of the earth's crust surface as well as seismic shocks.

The detection of earthquakes along with continental drifts are well known important problems at this time. This applies to related studies of both physics and geophysics as well as to the prediction of short and long term earthquakes. Since present methods do not satisfy reliability and cost needs, which ought to be characteristic of modern seismographs, used at numerous points of the earth's crust, for constant surveillance of the earth's crust movement, many precautions must be met in order for the optical seismograph to give reliable and reproducible measures of seismic shocks, particularly for a low cost seismographic measuring machine.

BRIEF DESCRIPTION OF THE INVENTION

More precisely, the present invention relates to an optical seismograph to measure the relative movement of an electromagnetic wave beam in relation to the extremities of a plurality of pendulums. These pendulums oscillate when seismic shocks occur. According to the present invention, the seismograph is characterized by a collimated source (luminous laser or electromagnetic wave guide) which gives a beam of electromagnetic waves, substantially parallel, and a plurality of pendulums oscillating in three perpendicular paths, means fixed in relation to the electromagnetic wave beam send the luminous beam on the heavy extremities of the different pendulums; photo electric methods measure the variation of the positions of the extremities of the different pendulums in relation to the beam. Thus, the shocks of the seismic drifts are measured according to three directions or perpendicular components.

The lasers used can either be continuous or pulsated. Energy radiations which are emitted must be compatible with the difference between the valence band and the conduction band of the photoresistant elements with either doped or not, semi-conductors which are preferably used. The photoresistant elements can be placed on the heavy extremities of the pendulums in which case, they ought to be connected to measuring and feeding means. The same heavy ends of the pendulums can be equipped with mirrors which reflect a light on different parts of the photoresistant element and modifying its resistance.

For the measurement of vertical movement of the earth's crust, the associated pendulum is a pendulum oscillating in a vertical, and, in this case the laser beam comes to the pendulum's extremity at an angle of incidence $\theta$, not zero, so that the pendulum's vertical movements provide a resistance variation of the photoresistant element which is set either on the pendulum's extremity or on a separate support; in this case, the pendulum's extremity was equipped with a mirrow.

The pendulums used, are advantageously small, for example, pendulums inclined from the vertical, whose period is between 1 and 10 seconds, approximately resonant with the frequency of most seismic shocks.

BRIEF DESCRIPTION OF THE DRAWINGS

Other characteristics and advantages will appear more clearly from the following description of preferred embodiments which are explanatory but not limited in any way. In the accompanying drawings.

Figure 1:
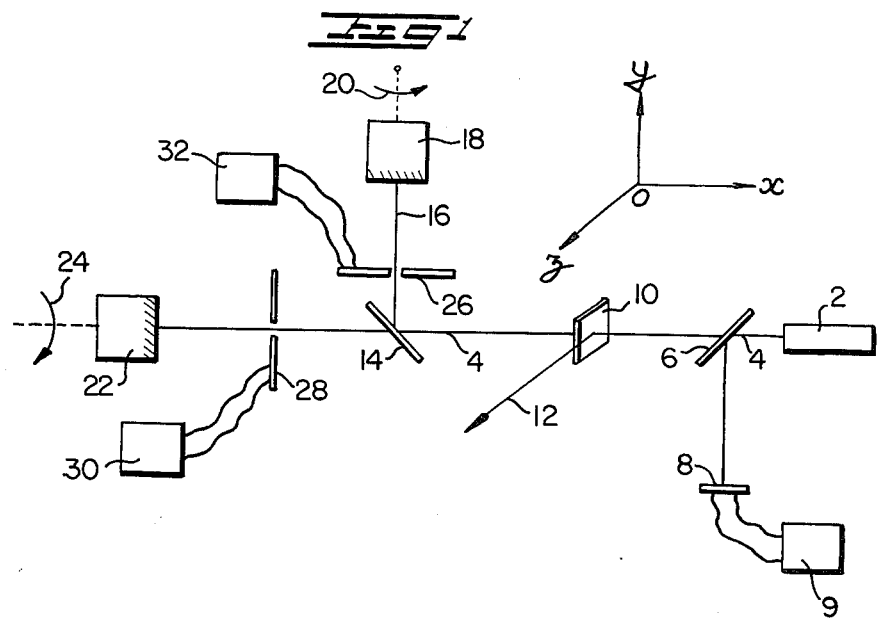
FIG. 1 is a schematic view of apparatus for observing the seismic shocks according to the present invention.

The seismograph represented in FIG. 1, thus provides for the measurement of seismic displacements according to three axes with coordinates Ox, Oy, Oz.

Figure 2:
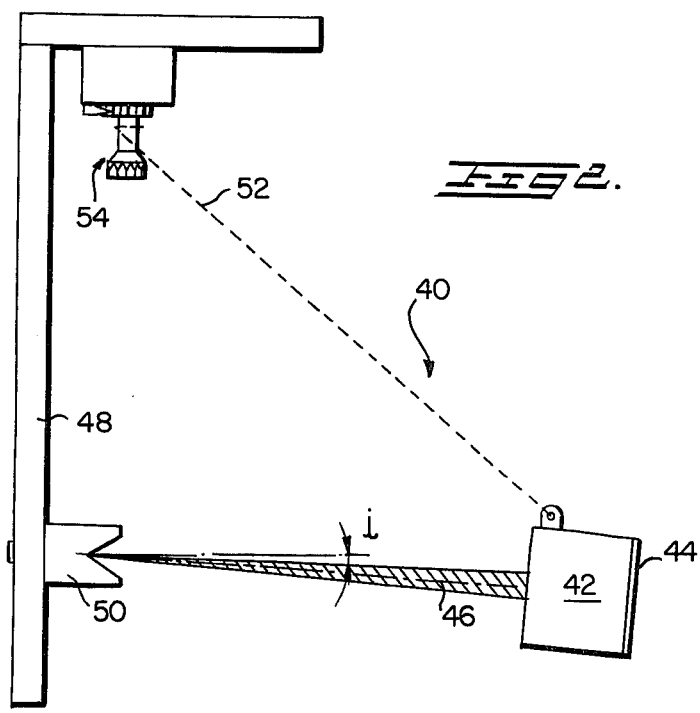
FIG. 2 is a view of an inclined pendulum used in a preferred embodiment of the present invention.

In FIG. 2, a pendulum used in the invention's preferred embodiment is sown. This pendulum consists of a mass 42 on which, on a face 44, is secured a mirror or photoresistant element. The pendulum's period is fixed by length L of arm 46 which makes an angle I with a horizontal plane, for example. This arm bears on construction 48 in a machined groove 50. The pendulum is kept in place by thread 52 extending between mass 42 and construction 48. The length of thread 52 can be altered by screw 54 which changes angle I.

It has been noted that periods of earthquake oscillations are on the order of a few seconds. In order to closely observe the earth's movements, it is better to use a slightly resonating pendulum, which means of a substantially equal period. For a particular frequency of 10 sec.$^{-1}$, the length of a simple pendulum would be 25 meters, which is obviously impractical. For this reason, an inclined pendulum is used in the present seismograph, as shown in FIG. 2. The oscillation period T of this pendulum is given by formula:

$$T = 2\pi \cdot \frac{\sqrt{I}}{G \sin I}$$

where G is the acceleration of gravity. For a value of I equal to 15 cm, and an angle I equal to 2° the period is 4.2 seconds. By changing the value of I, the period can be easily changed. This type of pendulum, as seen in FIG. 2, is well suited to measure vibrations on horizontal and vertical planes.

Figure 3:
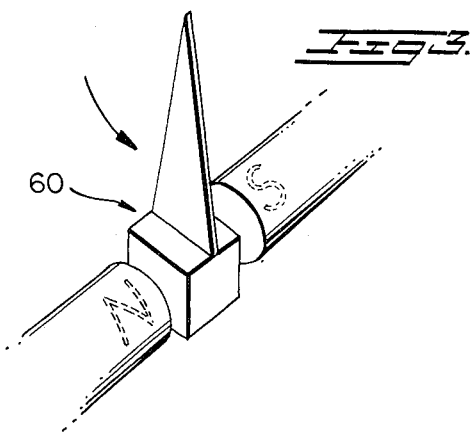
FIG. 3 is a view of electromagnetic cushioning means for the pendulum's extremity.

It is also possible, however, to vary, or more generally, to influence the period of a pendulum as shown in FIG. 2, by use of electromagnetic phenomena. As shown in FIG. 3, if the extremity of pendulum 60 is placed between the two parts of an electric magnet, the pendulum will be slowed by Foucault's current, if made of metallic material, or, by magnetic interaction if it is ferrite. North and South poles (N and S), can obviously be obtained with a permanent magnet or with electrified coils. The pendulum's heavy end can also include a coil.

Figure 4:
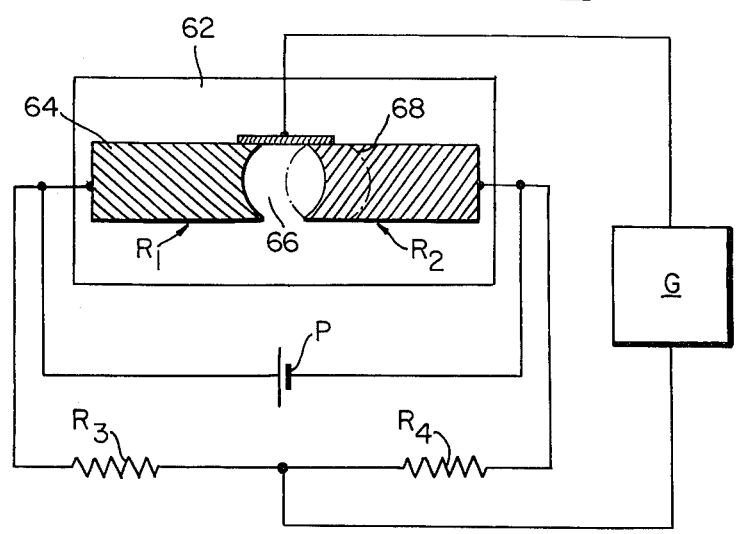
FIG. 4 is a view of the photoresistant element associated with a pendulum equipped with a mirror and its electrical circuitry.
Figure 7:
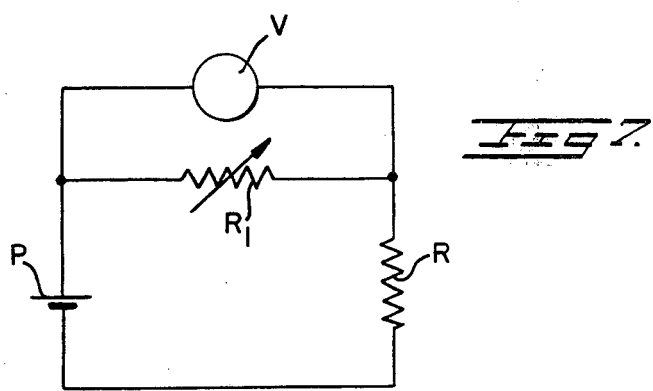
FIG. 7 is a variation of the circuitry for the photoresistant element In FIG. 1, a top view of the seismograph according to the invention is given. A source 2, a laser for example, emits an electromagnetic wave beam 4. A first partially reflecting optional mirror 6 sends part of the light to a first photoresistant element 8 linked to a member 9 which measures the resistance of element 8. This assembly is used for gauging the laser beam's intensity according to the weather and enables any systematic measurement error, related to these intensity variations, to be corrected. Beam 4 having passed mirror 6 is partially reflected by mirror 10, whose normal position is substantially at a 45° angle with beam 4 and passes as beam 12 onto a pendulum not shown which measures the seismic shock's vertical component. (Component along vertical Oz. Part of beam 4 thereafter, is deflected by a partially deflecting element 14 and is sent as beam 16 onto pendulum 18 which oscillates according to arrow 20. This pendulum is sensitive to the component of the seismic shock in direction Oy. The photoresistant elements are either set on the heavy extremities of pendulums 18 and 22, or as seen at 26 and 28 in FIG. 1, at a certain distance and provided with an opening to let the laser beam through. In this embodiment where the photoresistant elements are separated from the ends of the pendulums, the ends are equipped with mirrors, reflecting the incident laser beam onto different parts of the photoresistant elements as a function of their movements. Known elements 30 and 32 (Wheatstone bridge or others), measure the variations of photoresistants 26 and 28 caused by the movements of the pendulums. These variations are generated by the impact of the laser beams, at different photoresistant points. At equilibrium, in other words when the pendulums are at rest, the electric bridges which include the photoresistances, are balanced in such a way that the associated electrical signal is compensated for and corresponds to an output voltage of zero value. It appears obvious that when the photoresistors are on the pendulum's extremities, measurement devices 30 and 32 are connected to these photoresistors.

FIG. 4 is a top view of the photoresistant element used in the present seismograph. Plate 62 is equipped with a photoresistant element 64 having, for example, two resistant sides $R_1$ and $R_2$. Plate 62 has an opening 66 with a diameter equal to that of the laser beam. Resistors $R_1$ and $R_2$, are two Wheatstone bridge elements having resistors $R_3$ and $R_4$. A galvanometer G measures any bridge disequilibrium and is supplied by battery P. When the laser beam passes through opening 66, the bridge is at equilibrium with $R_1 R_4 = R_2 R_3$. When the laser beam strikes the photoresistor, as shown in dotted line 68, the bridge is in disequilibrium; $R_2$'s resistance value perceptibly diminishes because of irradiation by the laser beam. The variaton of $R_2$ is obtained with the current in galvanometer G. Instead of using the Wheatstone bridge connection which is very sensitive, as seen in FIG. 4, a connection, as shown in FIG. 7, can be used, where resistors $R_1$ and $R_2$ of FIG. 4 constitute a single resistor, $R_1$ only, whose variations are measured by a voltmeter V, across its extremities.

Resistor, R, is connected in series with a resistor $R_2$, the whole being supplied by a battery P.

Figure 5:
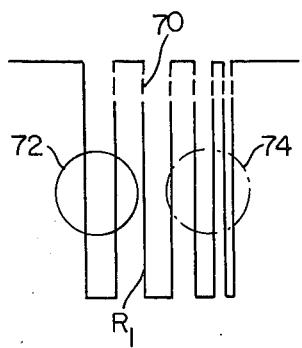
FIG. 5 is a detail of the photoresistant element.

The system shown in FIG. 4 works well for small pendulum oscillations; in other words, for oscillations smaller than the diameter of the laser beam. For bigger oscillations, however, the laser spot is completely over photoresistor $R_2$, for example, and its resistace would no longer vary. A system such as shown in FIG. 5 is used, where resistor R, is made with a photoresistant element in the form of a film or band 70 with variable displacement. This allows for laser beam movement from 72 to 74, and for the resistant surface intercepted by the laser beam to vary.

In all these systems, a similar numerical or electronic device can be used to correct non linearities, generated by variations of the surface irradiated by the laser beam, which are non proportional to its linear displacement, the laser beam's radial intensity distribution and the like.

Figure 6:
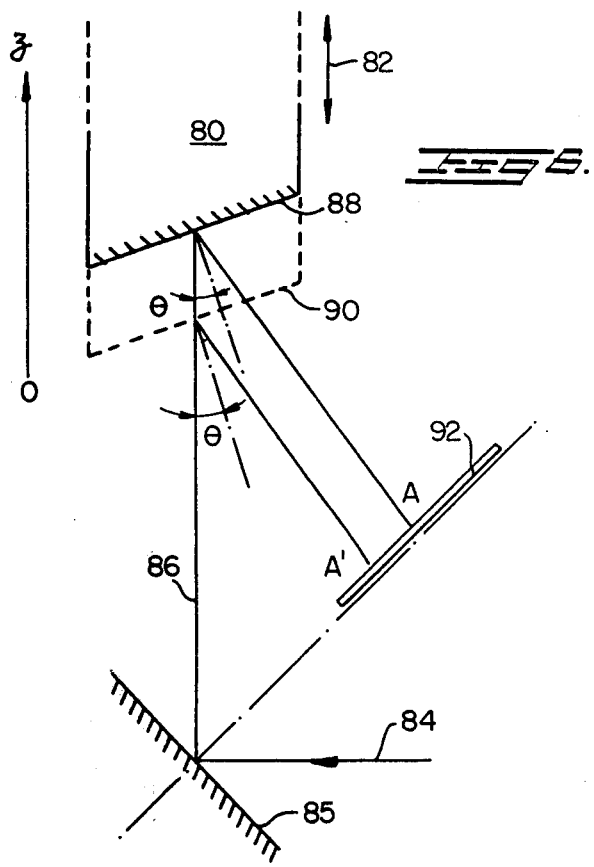
FIG. 6 shows the operation of the pendulum for measuring the vertical movements of the earth's crust.

FIG. 6 shows a device used to record a pendulum's vertical movement, in other words, along axis Oz. The pendulum's heavy extremity 80 moves according to arrow 82. Mirror 85 reflects beam 84, in accordance with beam 86, onto mirror 88 which is inclined by an angle θ (not zero), in relation to beam 86. It can be observed that when the mirror moves from position 88 to position 90, the part intercepted by photo resistor 92 moves from A to A', which enables the previous devices to be used, making a one spot movement correspond to a variation in resistance.

What we claim is:

1. Optical seismograph whose function is to measure the relative movement of a beam of electromagnetic waves connected to the extremities of a plurality of pendulums, comprising a collimated source which delivers a parallel beam of electromagnetic waves and a plurality of pendulums whose oscillation paths are perpendicular to one another; means fixed in relation to the electromagnetic wave beam to send the luminous beam onto heavy ends of said pendulums and photoelectric means to measure the position variations of said ends of said pendulums with respect to said electromagnetic wave beam.

2. Seismograph according to claim 1, said electromagnetic wave source being a laser beam which emits a parallel beam, and mirrors directing said luminous beam onto said ends of said pendulums, perpendicular to one another and oriented at 45° to said laser beam, said mirrors reflecting said beam on said heavy ends of said pendulums.

3. Seismograph according to claim 2, said ends of said pendulums including photoresistant means which deliver an electric signal as a function of variations in the position of said laser beams, with respect to said ends.

4. Seismograph according to claim 2, including mirrors at said ends of each of said pendulums, each of said mirrors including a photoresistant element whose resistance varies as a function of movement of said laser beam, as reflected by each of said mirrors.

5. Seismograph according to claim 4, said photoresistant elements having central opening through which said laser beam passes, reflected by a mirror at 45° with respect to said laser beam.

6. Seismograph according to claim 4, including a mirror at said end of said pendulum inclined at equilibrium at an angle θ with respect to said laser beam.

7. Seismograph according to claim 3, including a calibrating photoresistor in the ongoing trajectory of said laser beam and absorbing a part of said beam.

8. Device according to claim 1, said pendulums having a period between 1 and 10 seconds.

9. Device according to claim 8, including two pendulums inclined with respect to a horizontal plane.

10. Device according to claim 8, including a vertical pendulum receiving said beam at an angle θ with the vertical.

11. Device according to claim 8, including electromagnetic means to vary the damping of said pendulums.

* * * * *